United States Patent
Eusebi

(12) 
(10) Patent No.: US 6,615,865 B1
(45) Date of Patent: Sep. 9, 2003

(54) VALVE FOR HIGH PRESSURE GAS CYLINDERS

(75) Inventor: Gilberto Eusebi, Ancona (IT)

(73) Assignee: Eusebi Implanti-S.r.l., Ancona (IT)

( * ) Notice: Subject to any disclaimer, the term of this patent is extended or adjusted under 35 U.S.C. 154(b) by 0 days.

(21) Appl. No.: 10/019,599

(22) PCT Filed: Dec. 27, 1999

(86) PCT No.: PCT/IT99/00420
§ 371 (c)(1),
(2), (4) Date: Dec. 27, 2001

(87) PCT Pub. No.: WO01/02761
PCT Pub. Date: Jan. 11, 2001

(30) Foreign Application Priority Data

Jul. 6, 1999 (IT) .......................................... AN99U0031

(51) Int. Cl.⁷ ................................................ F16K 1/30
(52) U.S. Cl. .................... 137/557; 137/505; 137/505.25
(58) Field of Search ................................. 137/557, 505, 137/505.25

(56) References Cited

U.S. PATENT DOCUMENTS 5,398,721 A * 3/1995 Pryor ..................... 137/557 X
6,137,417 A * 10/2000 McDermott ............. 137/557 X \* cited by examiner Primary Examiner—Kevin Lee
(74) Attorney, Agent, or Firm—Armstrong, Westerman & Hattori, LLP

(57) ABSTRACT

This invention concerns a high rate discharge valve for high pressure gas cylinders provided with two separate openings, one for discharging and the other for refilling gas so that the empty cylinders can be refilled quickly and easily without disconnecting the valves from the gas discharge hose. This would indirectly make it possible to refill the cylinders on site, namely in the same room where the bank of cylinders is installed.

1 Claim, 6 Drawing Sheets

VALVE FOR HIGH PRESSURE GAS CYLINDERS

BACKGROUND OF THE INVENTION

1. Field of the Invention

This patent application concerns a gas refill and discharge valve for high pressure gas cylinders. The valve according to the invention is designed to resolve the problem of refilling gas cylinders used in fixed fire extinguishing systems, namely those installed in offices or buildings which are activated automatically following transmission of a signal by sensors placed in the areas monitored.

2. Description of Related Art

These extinguishing systems generally consist of a bank of large argon filled cylinders each having a capacity of 140 liters, filled at a pressure of 200 bar. It being evident that the larger the area monitored, the higher the number of cylinders used will be.

BRIEF SUMMARY OF THE INVENTION

In consideration of the above, the new high rate discharge valve has been designed with two separate openings, one for discharging and the other for refilling gas so that the empty cylinders can be refilled quickly and easily without disconnecting the valves from the gas discharge hose.

Each cylinder is fitted with a high rate discharge valve opened by means of actuators controlled by the signal received from the above peripheral sensors.

The major problem related to these systems is refilling the cylinders once the extinguishing gas has been discharged in that this operation is carried out at refilling centres to which the cylinders are transported.

Attention is drawn to the fact that the bank of cylinders is part of a fairly delicate fixed system consisting of equipment, piping and instruments which cannot be transported so that the system must first be disconnected from the empty cylinders and then reconnected to the refilled cylinders; for safety reasons the system must be controlled and tested carefully whenever the cylinders are removed and replaced.

Moreover, the empty and refilled cylinders must be transported carefully with appropriate means in that during transport there is the risk of damaging delicate components of the cylinders such as the above mentioned high rate discharge valves, the pressure gauges or the threaded bronze connections.

Transport of the cylinders is thus not only difficult but may also be dangerous for the operators in view of the weight of the cylinders and the high pressures involved which in fact render all the various operations hazardous.

The high rate discharge valves currently available on the market do not permit refilling the cylinders without disconnecting the same from the gas discharge hose in that said valves are provided with a single opening through which the argon gas is discharged and refilled.

A valve of the type mentioned above is described in U.S. Pat. No. 3,860,073. In said patent the valve has the connection designed both for refilling the cylinder and to actuate the discharge of the fire extinguishing system. In order to refill, with this type of valve it is necessary to disconnect the manual/electric actuator, connect the refilling connector and refill all the cylinders; in addition, since said valve is designed for two-phase fluids, it is necessary to first connect the refilling pipe of the fluid in its liquid state and then the nitrogen pressurisation pipe. By means of all these the automatic fire extinguishing system is totally shut down since all the actuators are dismounted from the pilot cylinders.

In consideration of the above, the new high rate discharge valve has been designed with two separate openings, one for discharging and the other for refilling gas so that the empty cylinders can be refilled quickly and easily without disconnecting the valves from the gas discharge hose.

This would indirectly make it possible to refill the cylinders on site, namely in the same room where the bank of cylinders is installed, obviously by providing a network of auxiliary piping therefor through which the cylinders are supplied; in other words said auxiliary system will on one hand be supplied from a point outside the storage room accessible to the refilling tanker and on the other will supply each individual cylinder whose high rate discharge valve will be connected permanently both to the refilling system and to the extinguishing system.

Refilling can therefore be carried out without removing and transporting the cylinders but simply by opening and closing the valves.

Although the valve according to the invention operates like a standard high rate discharge valve, the new valve is characterised by the fact that the following three sections, which in standard valves are grouped into a single section, have been physically separated:

gas discharge section;

pressure intake section for the installation of pressure gauges and pressure switches for detecting the lack of minimum pressure conditions;

refilling section.

For major clarity the description of the valve according to the invention continues with reference to the enclosed tables which are intended for purposes of illustration and not in a limiting sense, whereby:

DESCRIPTION OF THE PREFERRED EMBODIMENTS

Figure 1A:
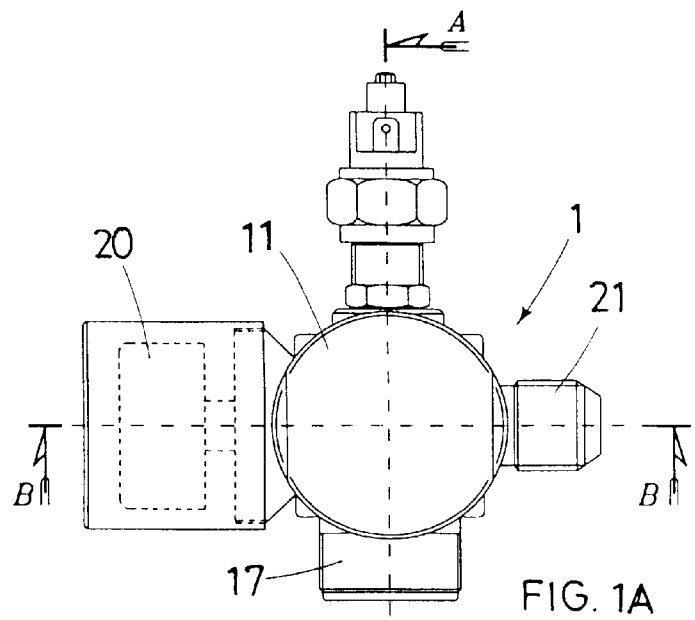
FIGS. 1A, 1B and 1C are three views of the valve in question.
Figure 1B:
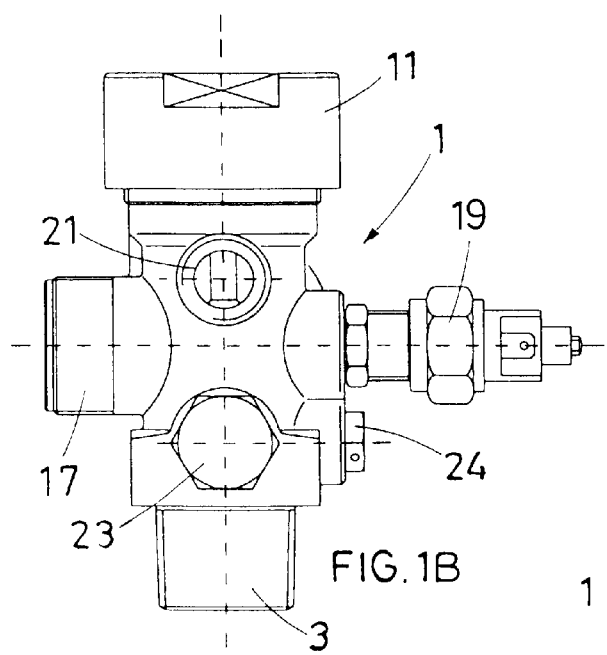
Figure 1C:
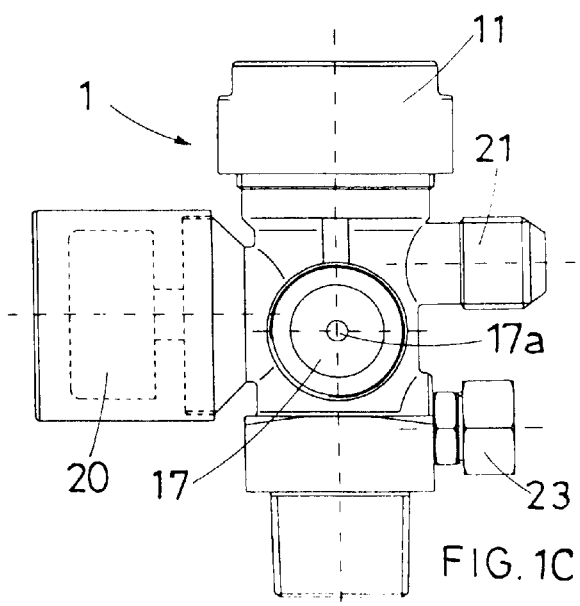
Figure 2:
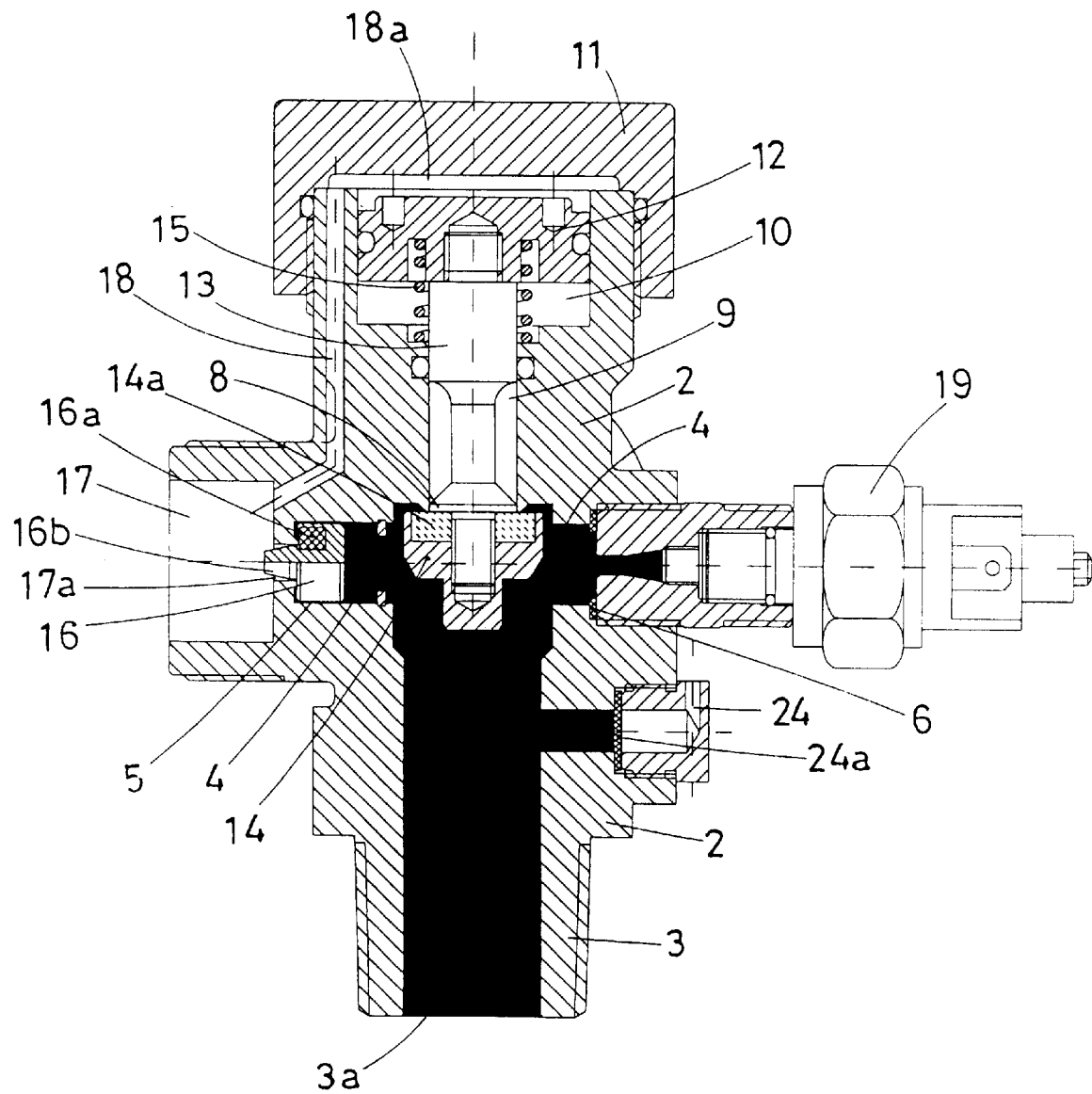
FIG. 2 is a cross-section on plane A—A of FIG. 1A, illustrating the valve in closed position.
Figure 3:
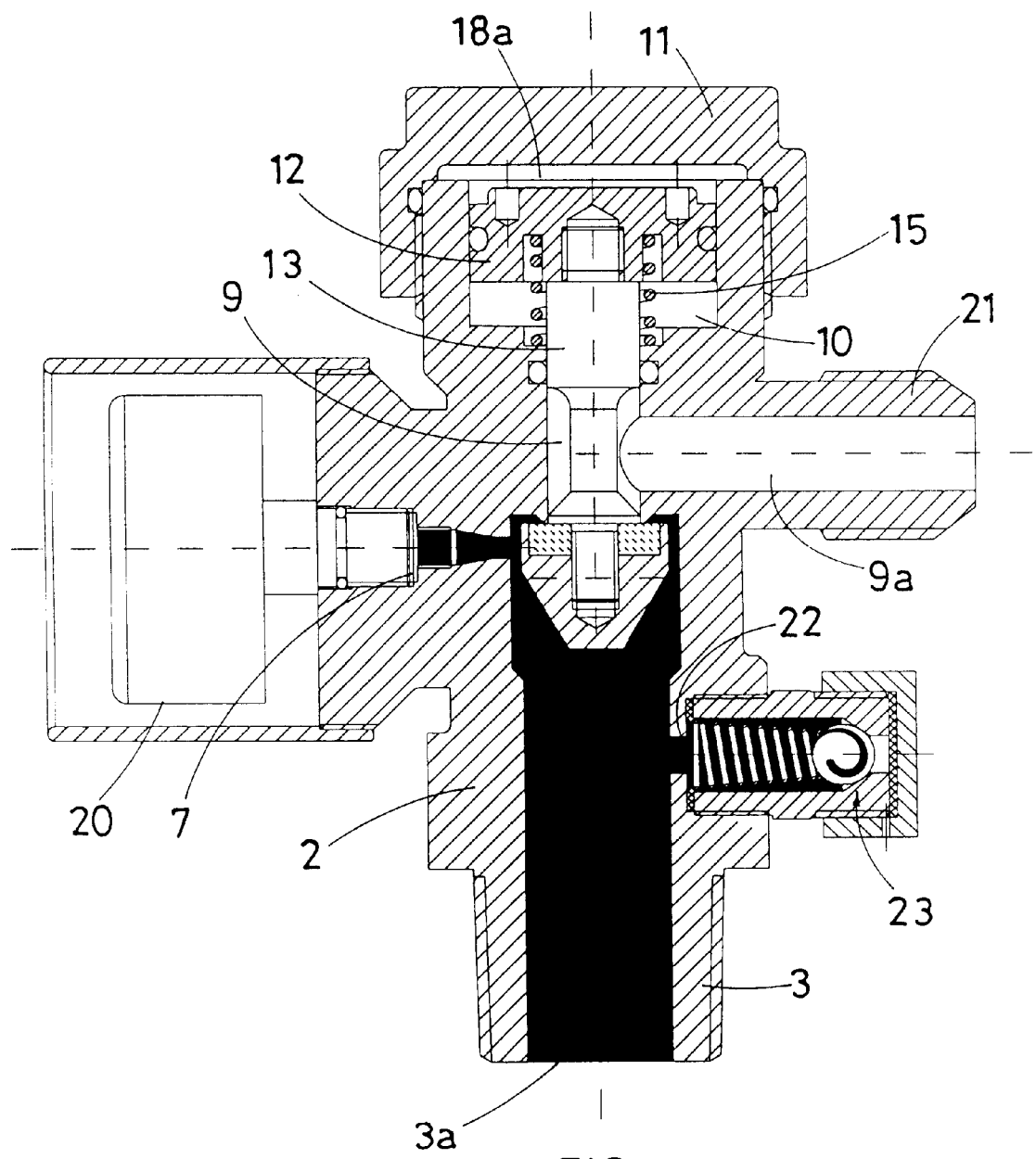
FIG. 3 is a cross-section on plane B—B of FIG. 1A, illustrating the valve in closed position.
Figure 4:
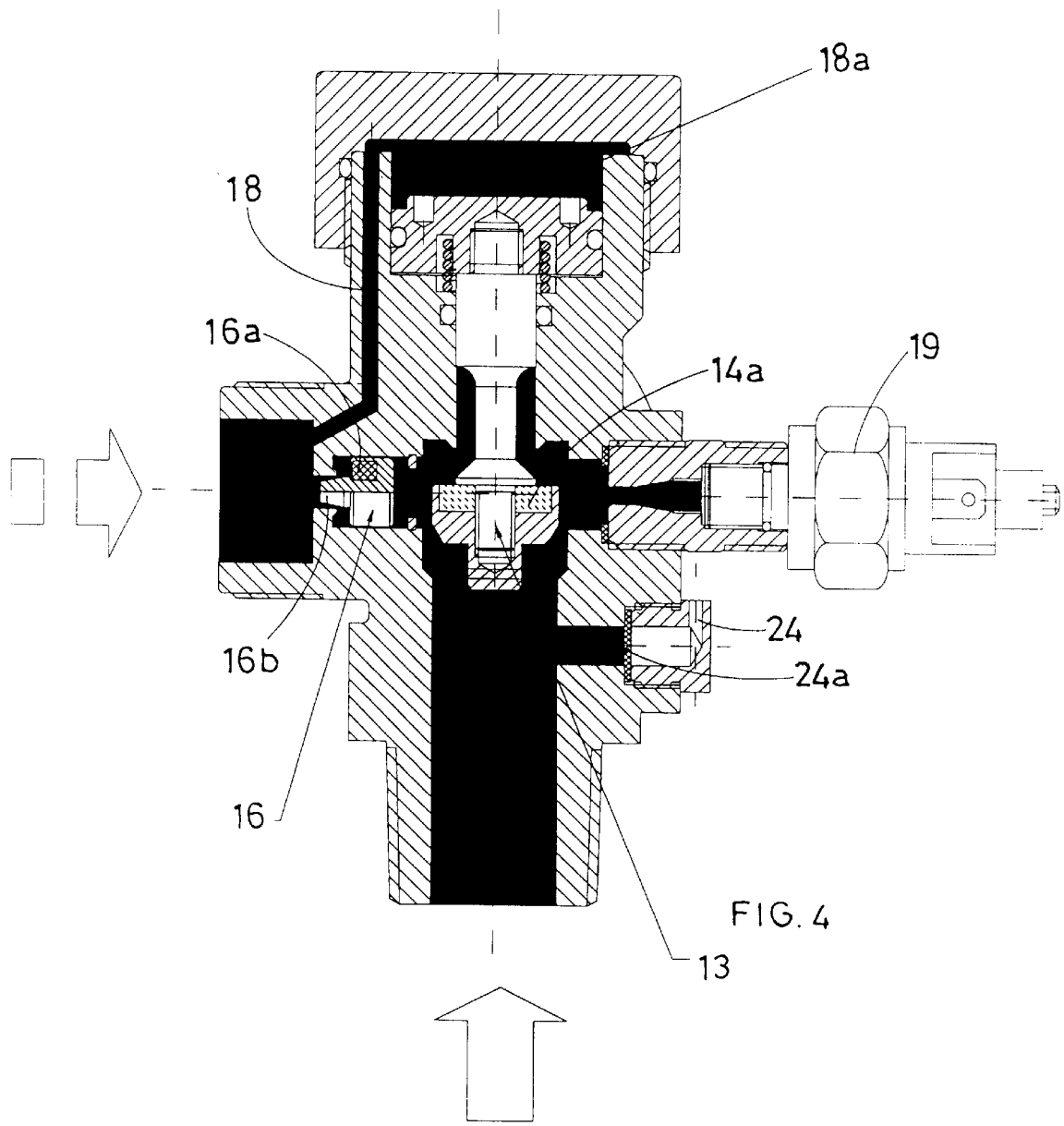
FIG. 4 is a cross-section on plane A—A of FIG. 1A, illustrating the valve in discharge position.

With reference to the above drawings, valve (1) according to the invention consists of a valve-body (2) terminating at the bottom with a threaded connection (3) screwed into the outlet of the cylinder (not shown in the figure).

The axial duct (3a) provided in said connection (3) terminates in a circular chamber (4) obtained in the valve-body (2) along whose lateral wall are provided three holes (5, 6 and 7), staggered by 90° while on the "roof" of said chamber (4) there is a central hole (8) forming the inlet of an overlying ascending duct (9) that opens at the top into a cylindrical chamber (10) formed on the valve-body (2) and sealed by a cap (11) screwed on the exterior of said cylindrical chamber (10).

Within said chamber (10) is housed, sealed and slides a piston (12), the rod (13) thereof being fitted and guided within said axial duct (9) and opening into the circular chamber (4).

It being provided that at the bottom end of said rod (13) is screwed a shutter plate (14), fitted with a gasket (14a), that hermetically seals the inlet hole (8) of the overlying duct (9) thanks to the traction of a return spring (15) fitted on the rod (13) that constantly exerts a lifting thrust on the piston (12).

The hole (5) forms the housing and sliding seat of a plug (16) on the back of which is fitted a gasket (16a) and a pin (16b) sealing a small hole (17a) that opens externally at the centre of a connection (17) on which is mounted the actuator (not shown) that opens the valve in case of fire.

It being provided that said connection (17) intercommunicates, by means of a duct (18), with the space (18a) between the cap (11) and the piston (12).

A nipple (6a) for the pressure switch (19) being screwed into the hole (6) and the pressure gauge (20) being fitted into the hole (7).

Along duct (9) is provided a radial branch (9a) that crosses and opens into gas outlet connection (21), while along duct (3a) is provided a hole (22) that opens externally into a threaded seat where the refill valve (23) is screwed.

When the valve is closed, the gas in the cylinder cannot escape from chamber (4) and from duct (3a) in that all the outlet holes provided in the same are hermetically sealed as follows:

hole (8) is closed by the plate (14);
hole (22) is closed by the refill valve (23);
hole (17a) is closed by the plug (16).

Figure 5:
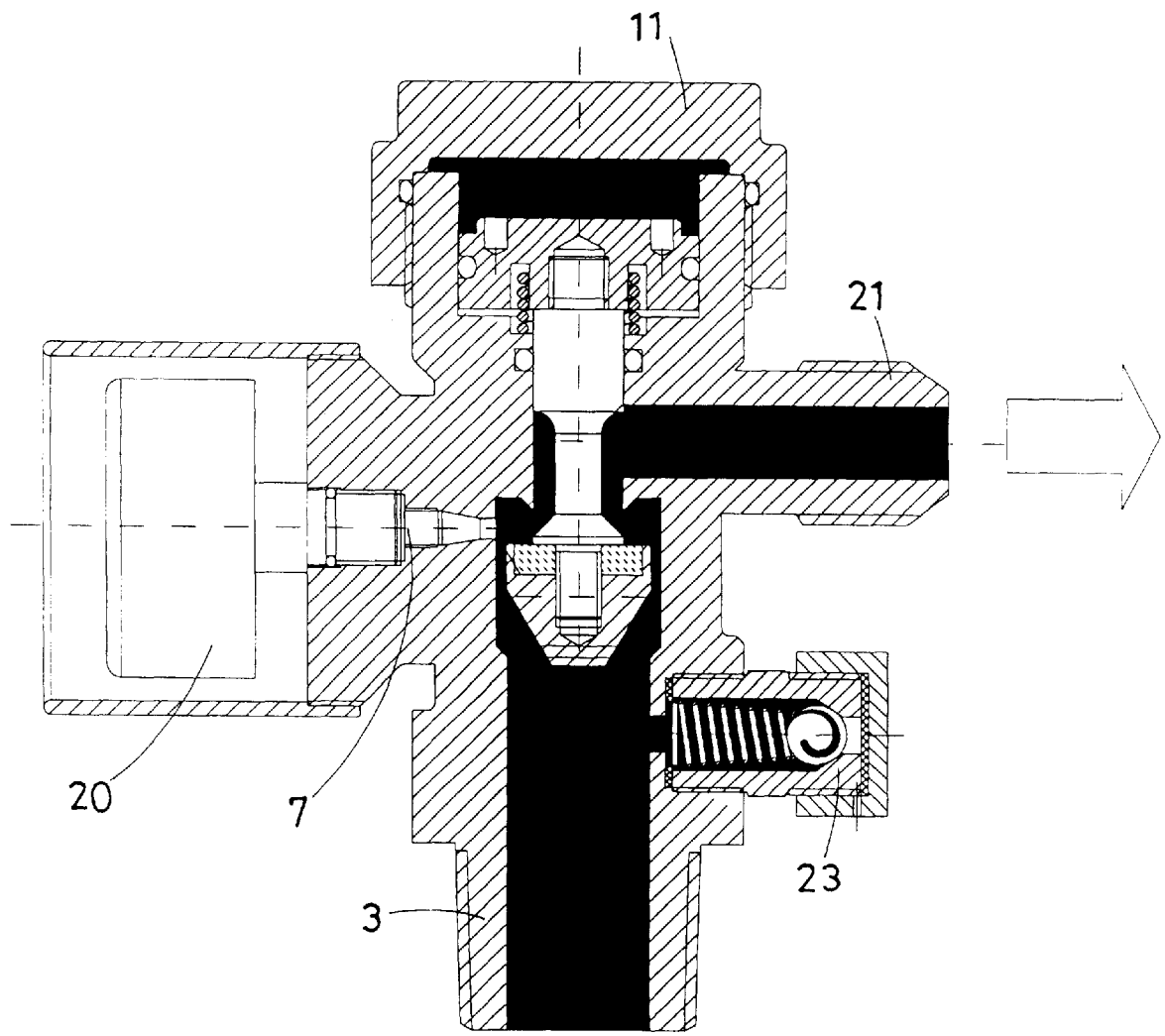
FIG. 5 is a cross-section on plane B—B of FIG. 1A, illustrating the valve in discharge position.
Figure 6:
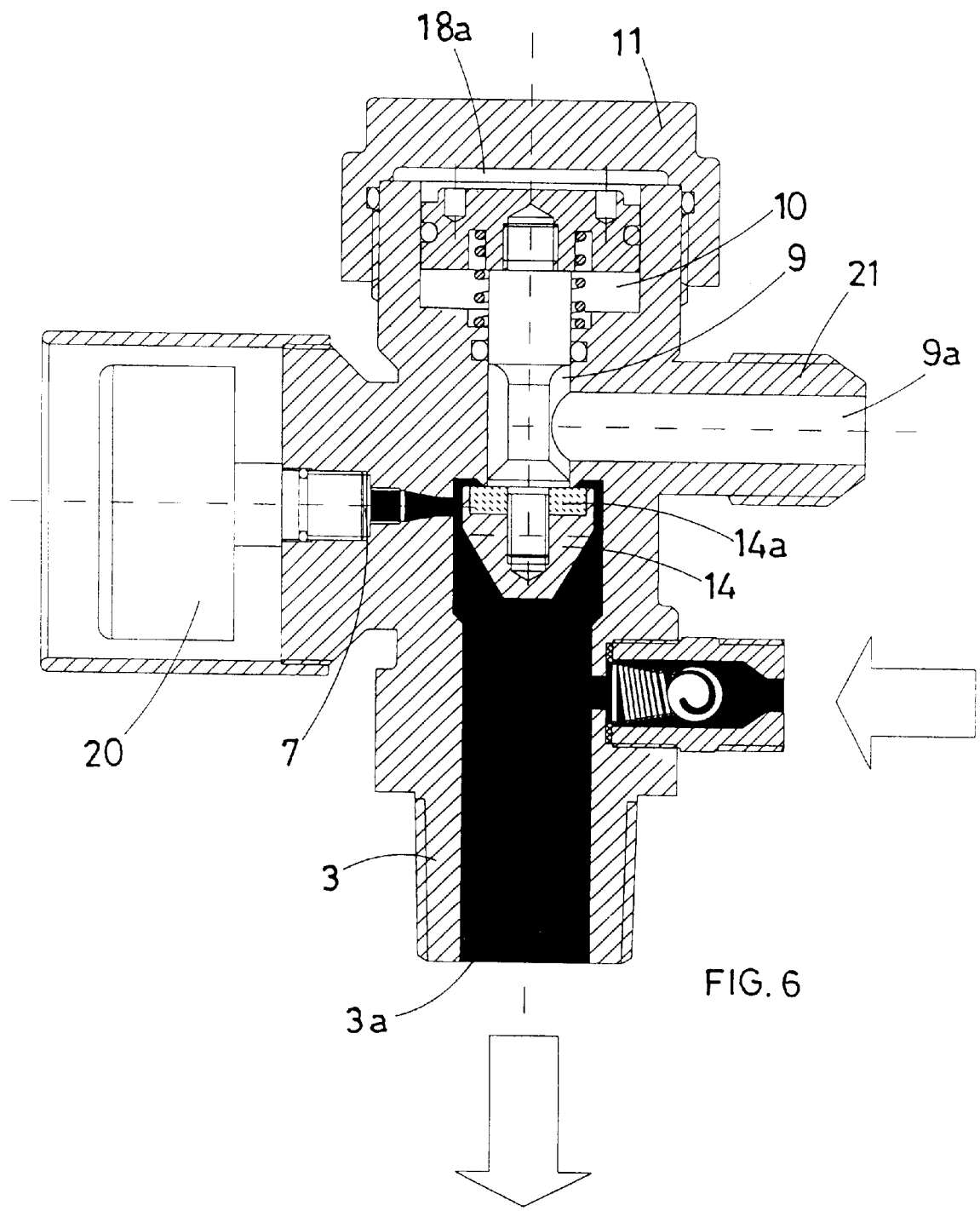
FIG. 6 is a cross-section on plane B—B of FIG. 1A, illustrating the valve in refilling position.

It being provided that valve (1) opens when the actuator pushes against the pin (16b) so as to move back the plug (16) allowing the gas to flow through hole (17a) into the connection (17) and into the space (18a) through the duct (18); consequently the piston (12) is lowered and the hole (8) is opened by the plate (14) so that the gas rises up the duct (9) and is discharged to the exterior through the branch (9a), as shown in FIG. 5.

The refill valve (23) is a standard one-directional valve, consisting of a ball subject to the thrust of a spring.

The number (24) refers to the safety outlet through which the gas escapes if its pressure exceeds a preset value; it being provided that said safety outlet includes a safety disc (24a) dimensioned to break when the pressure reaches said preset maximum value.

What is claimed is:

1. A valve for high pressure gas cylinder of the type consisting of a valve-body (2) terminating at the bottom with a threaded connection (3) whose internal duct (3a) opens into a circular chamber (4) the "roof" of which is provided with a central hole (8) forming the inlet of an overlying ascending duct (9) that opens at the top into a cylindrical chamber (10), formed on the valve-body (2) and sealed by a cap (11) screwed on the exterior of said cylindrical chamber (10), in which a piston (12) is housed, sealed and slides, wherein a rod (13) thereof is fitted and guided within the axial duct (9) and supports, at its bottom end, a shutter plate (14) fitted with a gasket (14a) that hermetically seals the inlet hole (8) of the overlying duct (9) thanks to the traction of a return spring (15) fitted on the rod (13) that constantly exerts a lifting thrust on the piston (12):

a—a valve characterised in that:
 a radial branch (9a), that supplies a gas outlet connection (21), is provided along duct (9);
b—a hole (22), that opens externally into a threaded seat where a refill valve (23) is screwed, is provided along duct (3a);
c—three holes (5, 6 and 7), staggered by 90°, are provided along the lateral wall of said chamber (4), wherein:
 the first hole (5) forms a housing and sliding seat of a plug (16) on the back of which is fitted a gasket (16a) and a pin (16b) sealing a small hole (17a) that opens externally at the centre of a connection (17) on which a valve opening actuator is mounted and which intercommunicates by means of a duct (18) with a space (18a) between the cap (11) and the piston (12);
 wherein a nipple (6a) for pressure switch (19) is screwed into the second hole (6);
 wherein a pressure gauge (20) is fitted into the third hole (7).

* * * * *